Feb. 10, 1942.  J. A. LINKS ET AL  2,272,413
REWIND DEVICE
Filed Sept. 7, 1940   2 Sheets-Sheet 1

INVENTORS
JULIAN A. LINKS
JEROME P. HERST
BY Boyken & Mohler
ATTORNEYS

Feb. 10, 1942.  J. A. LINKS ET AL  2,272,413
REWIND DEVICE
Filed Sept. 7, 1940   2 Sheets-Sheet 2
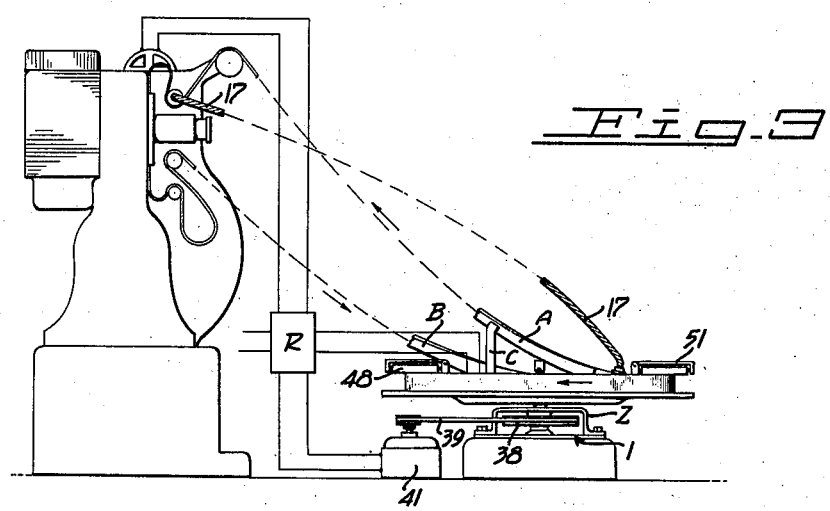
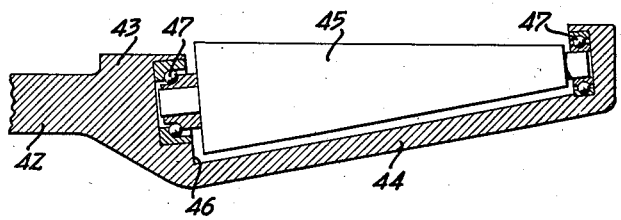
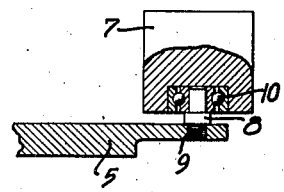
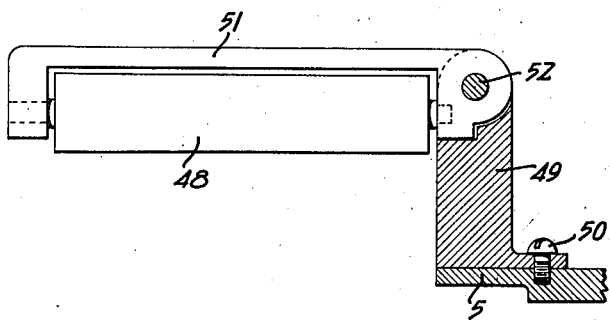
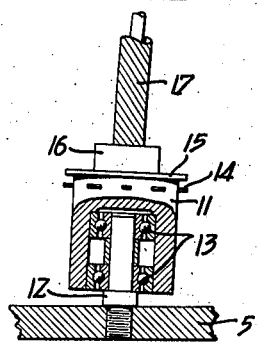
INVENTORS
JULIAN A. LINKS
JEROME P. HERST
BY Boykin + Mohler
ATTORNEYS Patented Feb. 10, 1942

2,272,413

UNITED STATES PATENT OFFICE 2,272,413

REWIND DEVICE

Julian A. Links and Jerome P. Herst, San Francisco, Calif., assignors of one-half to Max Jay Hirsch, San Francisco, Calif.

Application September 7, 1940, Serial No. 355,786

8 Claims. (Cl. 88—18.7)

This invention relates to a continuous rewind device for endless film used in conjunction with a motion picture projector.

One of the objects of the invention is a rewind device adapted to support the major length of the endless film in the form of a film coil and which device is constructed and arranged to so support such coil free from detrimental strain and wear during movement of the film past the lens of a projector.

Another object is a rewind device of the above character in which one of the edges of the convolutions of the coil rest on the support and in which the support and convolutions of the coil are adapted to move relatively in a manner to reduce wear on the film and the friction between the convolutions of the coil and support to the minimum.

Another object is a film rewind device for an endless film and a projector for the film, in which the projector and the device coact to substantially eliminate breakage of the film due to strain on the latter, and a still further object is a rewind device adapted to carry a much larger amount of film than heretofore and to feed such film from a large coil thereof to such projector and to rewind such film back to coil form without detrimental or dangerous strain on the film.

A still further object is a rewind device for a coil in an endless film, in which a length of the film is caused to unwind from the coil for passage past a projector and is then rewound on the coil in a manner to maintain relatively loose convolutions of film in said coil at all times.

Fig. 3 is a semi-diagrammatic elevational view illustrating the cooperation between the projector and the rewind device.

Fig. 4 is an enlarged part sectional, part elevational view of one of the rollers.

Fig. 5 is an enlarged part sectional, part elevational view of one of the idlers.

Fig. 6 is an enlarged, part sectional and part elevational view of one drive sprocket.

Fig. 7 is an enlarged part sectional, and part elevational view of one of the hold-down rollers.

Figure 1:
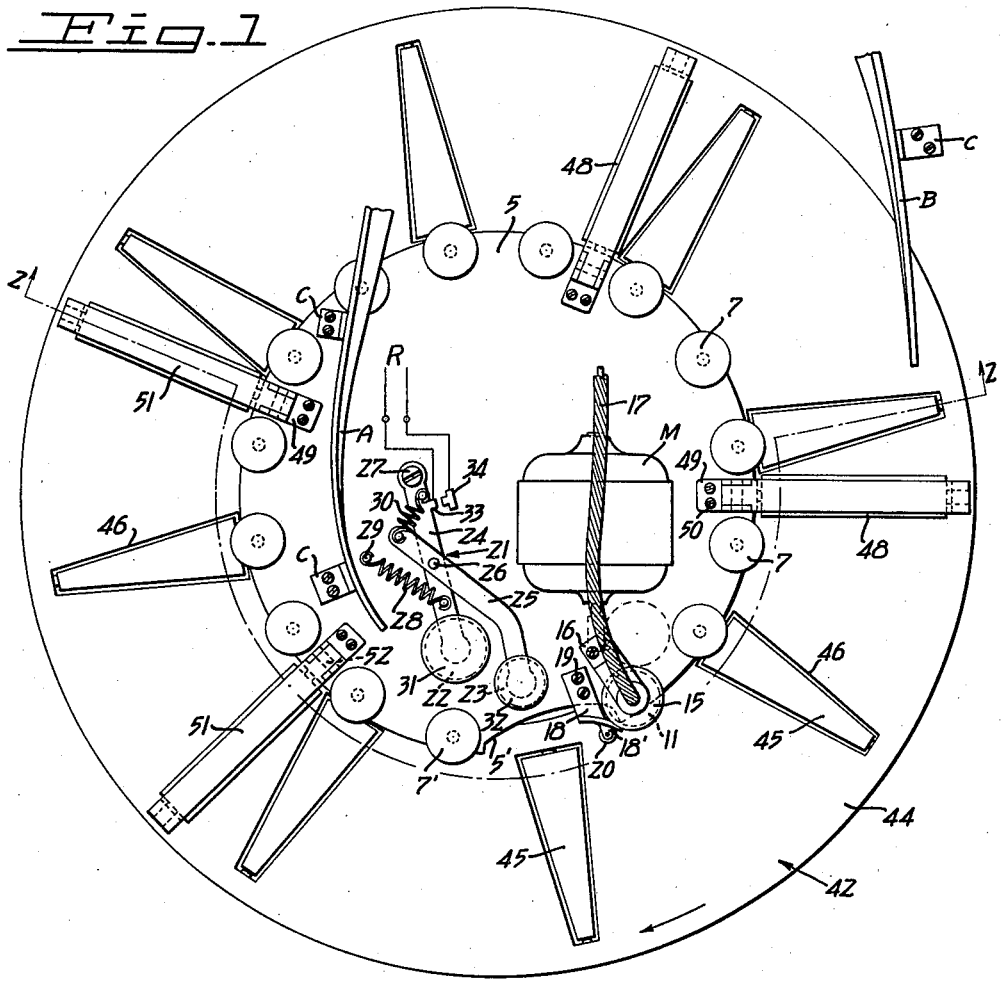
Fig. 1 is a top plan view of our invention with certain parts broken away.

Heretofore, the use of an endless coiled film with a projector for repassing the length of the film over and over again past the projector lens, has been found highly desirable, but considerable difficulty has been encountered due to the fact that the mechanisms employed have necessitated pulling a very substantial portion of the weight of the coil or reeled film by means of the take-off end of the film itself. Obviously, this mode of operation introduced high tension and strain in the strip of film and caused frequent breakage. Motion picture film, at best, is a fragile product and is not intended to stand any great tension or pull. As a consequence, the machines in the past, designed to pull the coil or reel of film by means of a single strip of film, produced great and unnecessary wear. This abuse was greatest when the projector and rewind device were first started, since the sudden jerk necessary to start the film and reel moving was substantial and often snapped the film so that the machine had to be stopped and re-threaded and the film spliced, all of which caused considerable delay. This objection was particularly noticeable when the film became slightly dirty or gummy causing the adjacent strips to stick together and refuse to separate easily when the machine was suddenly started.

Then, too, we are aware of no provision in the prior art of any adequate means of handling the problem of reeling the film on and off the reel at identical velocities, as it necessarily must, and which properly compensated for the fact that points on the outside circumference of the winding plate or reel traveled at very much higher velocities than points on the inside circumference. Such devices, accordingly, very often either caused the film to wind so tightly upon the reel and upon itself that the machine stopped and the film broke or failed to receive the returning film properly and it unravelled in a tangled mass into the space surrounding the projector and rewind mechanism.

The foregoing objections are eliminated in our invention by the provision of a horizontal, annular, rotating plate, on which a horizontal coil or reel of an endless film is adapted to be positioned. The take-off point for the film is at the inner circumference of the reel and plate, and from there the film is threaded to and through the projector and back to the outer circumference. At the inner take-off point is a power driven, stationary sprocket rotating in synchronism with the projector motor which positively drives the film by means of small teeth thereon projecting into the small holes provided on the edge of the film.

The rotating plate is fitted with radially extending, horizontally elongated, free rollers at equally spaced intervals around it, on which the horizontal coil or reel of film rests; and around the inside circumference of the plate are a number of stationary free idlers with vertical axes. Thus, the film may slide easily both along and upon the rollers of the plate and against the free idlers at the inner circumference. By rotating the plate at a speed where a point thereon radially beyond the return point of the film is traveling at a velocity equal to the velocity of the film at the take-off point and through the projector, it is seen that points at the inner circumference of the plate will travel at a velocity less than the velocity of the film; and thus, although the film is traveling faster than the plate at the outer convolution of film, it has considerable tendency to force the film ahead to cause it to reel loosely on the plate at the outer circumference. The ability of our invention to maintain a loosely packed reel upon the plate so that adjacent strips of film in the reel may easily slide by one another at all times is one of the most important advantages. It is only in this manner that the ordinary difference in velocities of points on the inner and outer circumference of the reel can be compensated for.

At the inner circumference, although there is relative motion between the plate and film, (the film having the greater velocity), it is slight as compared with the same relative velocity that existed in the older devices where the film was forcibly pulled across a stationary plate. It is clear that the greater the relative velocities between the film and the plate from which it is taken, the greater will be the force exerted upon the film to remove it therefrom.

By the use of this rotating plate, as will be explained more in detail herein, we have fully eliminated the two major problems which occur in continuous rewind operation, (1) the substantial pulling of and the resulting tension in the film, and (2) the piling up of film in the adjacent space or its breakage due to too tight reeling caused by the difference in velocities of points at the inner and outer circumferences of the reel.

In detail, our invention comprises a base, generally designated 1. The base 1 is provided with brackets 2 which extend upwardly from the base adjacent its outer edges and thence toward the center of the base, but above it for supporting a shaft 3. The base 1 is fitted at its center with a circular recess 4 to receive the lower end of shaft 3. The shaft is notched at its lower end to lock with an upwardly extending ridge in recess 4. At the upper end of the shaft and rigidly secured thereto is a circular horizontal bed 5. The bed 5, at and near its circumference and on the face adjacent base 1 is cut away at 6 to reduce its thickness at said outer circumference so that bed 5 may fit more closely to parts of the device to be described later.

Equally spaced around the circumference of bed 5 and on its upper edge are a number of vertical free idlers 7 mounted on vertical shafts 8 which are screwed into holes 9 provided in bed 5. These idlers may be provided with a ring of standard ball bearings 10 so that they may rotate more easily. The idlers 7 are mounted sufficiently close to the edge of base 5 so that their radially outer sides, relative to shaft 3, extend over the peripheral edge of the bed 5, for a purpose to be described later.

At one point around the edge of bed 5 and in place of one of the idlers 7 is a vertical drive sprocket 11 rotatable on shaft 12. Between sprocket 11 and one of the idlers 7' adjacent thereto, the spacing is slightly greater than between sprocket 11 and the idler 7 at the opposite side of the sprocket, or between adjacent idlers. While the shafts 8 of the free idlers 7 extend vertically, the shaft 12 extends only generally vertically and slightly outwardly of the bed 5 in a direction opposite to the movement of the film past said sprocket. The shaft 12 is mounted in bed 5 in the same manner as shafts 8, but is longer, extending substantially up into sprocket 11 with two sets of bearings 13, one located near the bottom of the sprocket and the other near the upper end. Near the upper edge of sprocket 11 and equally spaced around its circumference is a series of relatively small teeth 14 designed to engage the small holes on the edge of the film and thereby impart motion to the film as the sprocket is turned. Also positioned on the upper end of the sprocket 11 is a flat circular cap 15 whose diameter is slightly larger than that of the sprocket and so overhangs the upper end to act as a guide for the edge of the film to prevent its slipping off the sprocket. Sprocket 11 is held in position by means of a bracket 16 which is secured to the bed 5 to keep the drive pulley turning smoothly. Through this bracket 16 and secured to sprocket 11 is one end of a flexible drive cable 17, the other end of which, in one form of the invention, is attached to the drive sprocket on the projector, as diagrammatically indicated in Fig. 3. It is obvious that any other method, as a separate motor, indicated as M, in Figure 1, could be used to drive the sprocket 11 either separately or in combination with the projector sprocket so long as they are driven in synchronism. It is clear that the synchronous drive is indispensable since the sprocket on the projector is fitted with teeth similar to teeth 14 on sprocket 11 and the film must pass by both the sprocket on the projector and sprocket 11 on the rewind device at identical velocities to prevent the film from piling up or breaking between the two points.

In addition, there is mounted on bed 5 a film guide 18 by means of screws 19. Guide 18 is mounted on the circumference of bed 5 and closely adjacent sprocket 11 so that as the film passes off sprocket 11 it is threaded into guide 18. At the outer end of guide 18 is a small bracket 18', which mounts a small free rolling pulley 20 which is intended to support the coil of film away from sprocket 11 and guide 18 so that the single strip of film passing around sprocket 11 and through guide 18 is not interfered with by the remaining and adjacent convolutions of film in the reel. For this reason, guide 18 is located just beyond sprocket 11 on the circumference of bed 5 in the direction in which the film is moving (clockwise as Fig. 1).

Figure 2:
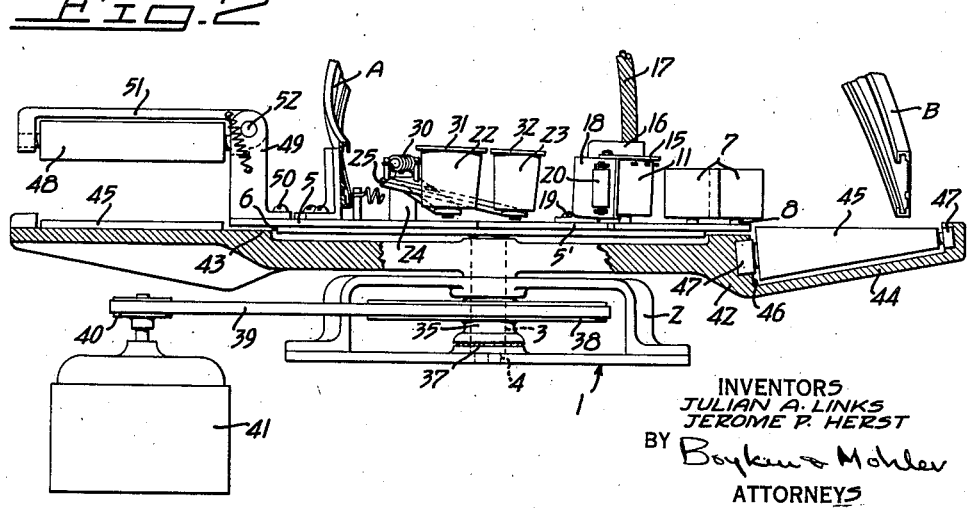
Fig. 2 is a part sectional, part elevational view generally along line 2—2 of Fig. 1, showing certain parts on the central bed in elevation, but with others omitted for purposes of clarity.

A safety device, generally designated 21 is also mounted on bed 5 which is composed of two free pulleys 22 and 23, whose sides are slightly tapered from one of their corresponding ends to facilitate slightly twisting the film transversely for entry of said film into guide strip A, positioned to rotate on the ends of two arms 24 and 25 pivoted together in scissor-like fashion with pivot 26. Arm 24 is screwed to bed 5 by means of screw 27 and is so arranged that its end near screw 27, the opposite end to that at which free pulley 22 is attached, is raised above bed 5 and so that the main length of arms 24 slopes toward bed 5 from its raised end. Arm 25 is pivoted to arm 24 by pivot 26 and has the same general slope as arm 24, as best shown in Fig. 2. Arm 24 is further held in position by means of one end of a spring 28, the other end of which is connected with a pin 29 on bed 5. Arm 25 is also attached to one end of a spring 30, the other end of which connects to arm 24 near screw 27. Free pulleys 22 and 23 are also provided at their upper ends with flat circular caps 31 and 32 respectively, whose diameters are slightly larger than the diameters of the pulleys, just as in the case of cap 15 on sprocket 11. Pulleys 22 and 23 may be mounted on arms 24 and 25 in the same manner as idlers 7 are mounted on bed 5.

The purpose of pulleys 22 and 23 and their mountings is to act as a guide for the film after it passes sprocket 11 and guide 18. The pulleys are so positioned on their sloped arms 24 and 25 so as to have their respective axes on a slight slope so that the film coming from guide 18 contacts the pulleys at a corresponding angle. From the time the film leaves sprocket 11 till it reaches pulley 22, it is continuously though slowly moving upwardly away from bed 5 as it necessarily must, due to the slope of the axis of sprocket 11 and the slope given to the axes of pulleys 22 and 23 by arms 24 and 25 as explained above. To facilitate this upward and inward motion of the film as it passes sprocket 11, bed 5 has been cut away at its circumference as at 5' so that the film may move toward the center of bed 5 without rubbing on plate 5.

Arm 24 is also provided with a contact point 33 which is adjacent contact point 34 on bed 5. Thus, when the film is normally passing pulleys 22 and 23, the points are not in contact. But should the film, for any reason, tighten or become taut after leaving wheel pulley 22, springs 28 and 30 would be forced to expand and arm 24 would swing to bring the contacts 33 and 34 together. This action causes a relay R to cut off the power to the motor 41, and the projector motor and motor M, if it is used, driving the projector and rewind device, and the motion of the film is stopped. It is seen that the arms and springs act as a safety device to protect the film from breaking if for any reason it jams or tightens. The use of a relay is diagrammatically illustrated in Fig. 3, but it is obvious that any other analogous method might be used from shutting off the power when arms 24 and 25 were moved to bring the contact points together.

Along and surrounding shaft 3 and below bed 5, a sleeve 35 is mounted to revolve around the shaft by means of a ring of ball bearings and a thrust bearing 37 positioned near the end of the sleeve. This sleeve extends upwardly from just above base 1 and between base 1 and bracket 2 is a wheel 38 secured to the sleeve to turn with it. The wheel 38 is rotated by means of belt 39 which extends at its other end around wheel 40 on motor 41.

Sleeve 35 continues upwardly from the point at which wheel 38 is mounted on it, past brackets 2 and at its upper end adjacent bed 5, but below it, supports a circular plate 42. Sleeve 35, wheel 38 and plate 42 are all supported in position by means of a thrust bearing 37 which prevents the sleeve, plate and wheel from slipping downward and away from bed 5.

Plate 42 is substantially flat and of constant thickness axially to about the point 6 where bed 5 has been cut away on its under side. Here plate 42 has an upwardly extending annular ridge 43 which is designed to lie closely adjacent the under side of bed 5 near its circumference. Plate 42 extends axially outward from ridge 43 in a thin portion 44 so that the overall diameter of plate 42 is substantially greater than the diameter of bed 5.

Portion 44 of plate 42 is provided with a series of long horizontal rollers 45 equally spaced around said plate, and extending radially of the central vertical axis of plate 42. Rollers 45 are mounted in slots 46 in portion 44 of plate 42 which slots receive at each end a ring of ball bearings 47, on which rollers 45 are supported.

These rollers 45 are preferably tapered in direction toward their outer ends and the bearings at their ends are disposed relatively so that the upper sides of the rollers are at all times disposed in a single horizontal plane. Thus, the radially outer convolution of the coil of film thereon and the radially inner convolution of the coil, and any convolution between said outer and inner convolution, will be supported on said rollers for revolving thereon without frictional resistance resulting from the different speeds of travel of different points along said rollers about the central axis of the plate 42, as would normally be the case were the rollers straight sided, or were the coil supported on the plate itself. The positioning of the rollers with their upper sides in a single horizontal plane prevents any tendency of the convolutions of the film coil from crowding together toward the axis of the plate 42. While the use of tapered rollers is preferable, it is to be noted that where the plate 42 is revolved, as in this instance, even the omission of rollers or the use of straight sided rollers, in the order given, are far superior to construction in which the plate supporting the coil of film is not revolved.

Extending from bed 5 over and above portion 44 of plate 42 are other similar rollers 48, which do not touch the film. There may be only three or four of these rollers spaced around the circumference mounted between adjacent idlers 7. Rollers 48 are mounted on bed 5 by means of upwardly extending bases 49 attached to the bed by means of screws or bolts 50. Base 49 is slotted at its upper extremity, in a direction axially of bed 5 to receive one end of carrying arm 51 which also extends radially of the axis of bed 5 and out and over portion 44 of plate 42. Carrying arm 51 is mounted in the slot in the upper end of base 49 by means of bolt 52 in such a manner that arms 51 and the rollers 48 mounted therein may be swung upward and vertically over bed 5 in a position where none of the mounting or roller extends beyond the circumference of bed 5.

Adjacent the take-off and return points of the film to our rewind device, are positioned guide channel strips A, B, supported by any suitable brackets, as indicated at C and as described in our co-pending applications, Serial No. 293,348, filed September 5, 1939, and Serial No. 333,528, filed May 6, 1940, which are adapted to receive the film and position and guide it for proper entrance to and exit from the projector. Although it is important that the film be properly positioned at the take-off and return points of the projector, such positioning is not deemed to be part of the invention described herein.

In operation, a coil of continuous film with an external loop extending from its inner convolution to its outer convolution is laid flat upon rollers 45 after the arms 51 and rollers 48 have been swung to a substantially vertical position over bed 5. The inner convolution of film is positioned so as to engage teeth 14 of sprocket 11 and is then run through guide 18, past guide pulley 23, partially around guide pulley 22 and into a guide channel strip A. From the guide channel A, the film is threaded through the projector in the ordinary manner and back to another guide channel strip B which brings it into position for receipt at and as the outer convolution of film on the coil mounted on plate 42 and rollers 45. Arms 51 and rollers 43 are then swung down and over the film reel so that as the reel travels around plate 42, it rests and is guided on its lower side by rollers 45, guided at its upper side by rollers 43 against accidental upward displacement, and guided at its inner circumference by idlers 7, and by small pulley 20 mounted on guide 18 to lead the remaining portion of the reel of film around plate 42 and away from the inner strip passing around sprocket 11. In placing the film in position it should be loosely reeled for proper operation.

As has been explained, sprocket 11 and the projector sprocket are driven by the same motor or at least by motors in synchronism. Wheel 38 atached to sleeve 35 and plate 42 is driven by a separate motor. The motors are operated simultaneously. Motor 41 is operated so as to revolve plate 42 in the same direction as the film is being taken off, or clockwise, in Fig. 1. When the motors are started, sprocket 11 revolves, leading the inner strip of film off the reel and at the same time plate 42 revolves, tending to carry the reel in the same direction. As explained above, the film, at all points along its length, must necessarily be traveling at the same absolute velocity, though its velocity relative to plate 42 varies from point to point. The motor 41 causes plate 42 to rotate at a speed at which the velocity of some point on the plate radially beyond the outer convolution of film is equal to the absolute velocity of the film. Thus, there is relative motion between the film and plate at all points and the rotation of the plate has the effect of pushing or scooting the film along, although the film is traveling faster, so that at all points the reeling is more loose than if the plate were stationary as in the former devices where relative speeds were greater between film and plate.

From our investigation, it appears that there is a substantially critical velocity range for the plate with reference to the length of the film which is reeled upon the plate, so that it will remain reeled with the proper degree of looseness. Provision is therefore made for changing the wheel 40 on motor 41 to change in turn the speed at which plate 42 rotates. Of course, the same relative changes might be made by changing the size of wheel 38 or by changing the diameter of bed 5 around which the film is necessarily reeled. It is thought that the size of the device remaining constant, the larger the length of film reeled thereon, the lower (in R. P. M.) will be the velocity of the plate 42. As an example, if the diameter of the inner convolution of film adjacent idlers 7 is approximately 10⅜ inches, it will be found that plate 42 should be rotated at about 12¼ revolutions per minute for 400 feet, of film, 11⅕ revolutions per minute for 600 feet of film, 9⅘ revolutions per minute for 800 feet of film and 8⅕ revolutions for 1000 feet of film. These figures are necessarily only approximate and serve as an example only.

Should any difficulty arise after the machine is started causing the film to become taut after it leaves pulley 22, the tightening of the film would be compensated for by the movement of pulleys, 22 and 23 and arms 24 and 25; and if the tautness becomes too great, the contact points 33 and 34 would be closed by arm 24, causing a relay to cut off the power to both the motors which operate the projector and the rewind device.

It is further obvious that the single projector motor may be, with the aid of conventional connections, as shown in Figure 1, designed to drive all the parts of the projector and rewind device, including the plate 42, at their relative speeds, as indicated.

We claim:

1. A continuous rewind device of the character described, for an endless film in the form of a centrally open, generally annular coil having a loop of the film extended from the inner and outer convolutions of said coil, respectively, a plurality of rollers supporting said coil on its side for revolving about its central axis on said rollers, means positioning said coil on said rollers, means for revolving said rollers bodily about said axis, and means for revolving said coil on said rollers about said axis.

2. In a construction as defined in claim 1, said rollers being elongated and extending radially of said axis, means mounting said rollers in said radially extending position for freely revolving on their respective axes upon revolvable movement of the coil on said rollers relative to the rollers.

3. In a construction as defined in claim 1, the sides of said rollers being tapered toward their outer ends and the sides of the said rollers engaging the convolutions of said coil being planar and disposed in a flat horizontal plane.

4. A continuous rewind device of the character described, for an endless film in the form of a centrally open, generally annular coil having a loop of the film extended from the inner and outer convolution of said coil, respectively, rotatable means for supporting said coil on its side for revolving about its central axis on said means, antifriction means mounted on said rotatable means, means positioning said coil on said rotatable means, means for revolving said rotatable means bodily about said axis, and means for revolving said coil on said rotatable means about said axis.

5. In a construction as defined in claim 4, said means for revolving said coil comprising a positively driven sprocket positioned to engage the inner convolution of film in said coil.

6. A continuous rewind device of the character described, for an endless film in the form of a centrally open, generally annular coil having a loop of the film extended from the inner and outer convolutions of said coil, respectively, a frame on which said coil is supported, means for revolving said coil on said frame about the central axis of said coil, means for revolving said frame, means positioning said coil on said frame, and means on said frame for compensating for relative motion between said frame and the convolutions of said coil.

7. In a construction as defined in claim 6, said first mentioned means comprising a positively driven sprocket positioned to engage the inner convolution of film in said coil.

8. In a construction as defined in claim 1, said last mentioned means comprising a positively driven sprocket positioned to engage the inner convolution of the film on said coil.

JULIAN A. LINKS.
JEROME P. HERST.